US008277925B2

(12) United States Patent
Dietz

(10) Patent No.: US 8,277,925 B2
(45) Date of Patent: Oct. 2, 2012

(54) MULTILAYER MOUNTING MAT

(76) Inventor: Peter T. Dietz, Eagan, MN (US)

( * ) Notice: Subject to any disclaimer, the term of this patent is extended or adjusted under 35 U.S.C. 154(b) by 719 days.

(21) Appl. No.: 12/302,707

(22) PCT Filed: May 29, 2007

(86) PCT No.: PCT/US2007/069839
§ 371 (c)(1),
(2), (4) Date: Aug. 14, 2009

(87) PCT Pub. No.: WO2007/143437
PCT Pub. Date: Dec. 13, 2007

(65) Prior Publication Data
US 2009/0304560 A1 Dec. 10, 2009

Related U.S. Application Data

(60) Provisional application No. 60/803,664, filed on Jun. 1, 2006.

(51) Int. Cl.
B32B 7/12 (2006.01)

(52) U.S. Cl. .............. 428/201; 428/195.1; 428/329; 156/6; 156/291; 156/295; 422/179

(58) Field of Classification Search ........... 428/195.1, 428/201, 329; 156/60, 291, 295; 422/179
See application file for complete search history.

(56) References Cited

U.S. PATENT DOCUMENTS

| 3,001,571 A | 9/1961 | Hatch |
| 3,441,381 A | 4/1969 | Keith et al. |
| 3,458,329 A | 7/1969 | Owens et al. |
| 3,709,706 A | 1/1973 | Sowman |
| RE27,747 E | 9/1973 | Johnson |
| 3,795,524 A | 3/1974 | Sowman |
| 3,798,006 A | 3/1974 | Balluff |
| 3,916,057 A | 10/1975 | Hatch et al. |
| 4,047,965 A | 9/1977 | Karst et al. |
| 4,048,363 A | 9/1977 | Langer et al. |
| 4,181,514 A | 1/1980 | Lefkowitz et al. |
| 4,521,333 A | 6/1985 | Graham et al. |
| 4,880,168 A | 11/1989 | Randall, Jr. et al. |
| 4,929,429 A | 5/1990 | Merry |
| 5,028,397 A | 7/1991 | Merry |
| 5,032,441 A | 7/1991 | Ten Eyck et al. |
| 5,250,269 A | 10/1993 | Langer |
| 5,290,522 A | 3/1994 | Rogers et al. |
| 5,332,699 A | 7/1994 | Olds et al. |
| 5,380,580 A | 1/1995 | Rogers et al. |
| 5,384,188 A | 1/1995 | Lebold et al. |
| 5,523,059 A | 6/1996 | Langer |
| 5,585,312 A | 12/1996 | TenEyck et al. |
| 5,714,421 A | 2/1998 | Old et al. |
| 5,874,375 A | 2/1999 | Zoitos et al. |
| 6,967,006 B1 | 11/2005 | Wirth et al. |
| 7,387,822 B2 * | 6/2008 | Dinwoodie .................. 427/402 |
| 2004/0234436 A1 | 11/2004 | Howorth |
| 2006/0008395 A1 * | 1/2006 | Ten Eyck et al. ........... 422/179 |
| 2007/0140929 A1 * | 6/2007 | Watanabe et al. ........... 422/179 |
| 2008/0253939 A1 * | 10/2008 | Hornback ..................... 422/168 |

FOREIGN PATENT DOCUMENTS

| EP | 0 396 331 | 11/1990 |
| EP | 1 388 649 | 2/2004 |
| WO | WO 99/39086 | 8/1999 |

OTHER PUBLICATIONS

"Systems Approach to Packaging Design for Automotive Catalytic Converters," Stroom et al., Paper No. 900500, SAE Technical Paper Series, 1990.
"Thin Wall Ceramics as Monolithic Catalyst Supports," Howitt, Paper 800082, SAE Technical Paper Series, 1980.
"Flow Effects in Monolithic Honeycomb Automotive Catalytic Converters," Howitt et al., Paper No. 740244, SAE Technical Paper. Series, 1974.
"Cellular Ceramic Diesel Particulate Filter," Howitt et al., Paper No. 10114, SAE Technical Paper Series, 1981.

* cited by examiner

Primary Examiner — Bruce H Hess
Assistant Examiner — Christopher Polley

(57) ABSTRACT

A multilayer mounting mat operatively adapted for use in mounting a pollution control element in a pollution control device comprises a first layer, a second layer, and an adhesive sandwiched therebetween so as to bond together a major surface of the first layer to a major surface of the second layer, the adhesive comprising at least one of inorganic colloidal particles having an average diameter less than about 300 nm and an inorganic water-soluble salt.

27 Claims, No Drawings

MULTILAYER MOUNTING MAT

CROSS REFERENCE TO RELATED APPLICATIONS

This application is a national stage filing under 35 U.S.C. 371 of PCT/US2007/069839, filed May 29, 2007, which claims priority to U.S. Provisional Application No. 60/803664, filed Jun. 1, 2006, the disclosure of which is incorporated by reference in its/their entirety herein.

FIELD

This invention relates to multilayer mounting mats operatively adapted for use in mounting a pollution control element (e.g., a catalyst carriers, filter elements, and combinations thereof) in a pollution control device (e.g., a catalytic converters, exhaust filters), to methods for making the mounting mats, and to pollution control devices comprising the mounting mats.

BACKGROUND

Pollution control devices are universally employed on motor vehicles to control atmospheric pollution. Two types of devices that are currently in widespread use are catalytic converters and diesel particulate filters. Catalytic converters contain a catalyst, which is typically coated onto a monolithic structure in the converter. The catalyst oxidizes carbon monoxide and hydrocarbons, and reduces the oxides of nitrogen in automobile exhaust gases to control atmospheric pollution. Diesel particulate filters are wall flow filters which have honeycombed monolithic structures typically made from porous crystalline ceramic materials.

In the state of the art construction of these pollution control devices, each device typically has a metal casing which holds within it a monolithic structure or element that can be metal or ceramic, and is most commonly ceramic. The ceramic monolith generally has very thin walls to provide a large amount of surface area so it is fragile and susceptible to breakage. It also has a coefficient of thermal expansion generally an order of magnitude less than the metal (usually stainless steel) casing in which it is contained. In order to avoid damage to the ceramic monolith from road shock and vibration, to compensate for the thermal expansion difference, and to prevent exhaust gases from passing between the monolith and the metal casing, protective packing materials (for example, ceramic "mounting mats") are typically packed between the ceramic monolith and the metal casing.

The process of placing or inserting the protective packing material includes processes such as wrapping a sheet material (that is, a mounting mat) around the monolith and inserting the wrapped monolith into the casing.

Typically, the materials used to form mounting mats include refractory ceramic fibers that provide properties such as high temperature durability, good handling, resiliency, flexibility, and strength. An intumescent material can also be used to enable the mounting mat to volumetrically expand at elevated temperatures. Such expansion helps to hold the monolith in place during use.

Often, mounting mats are formed by bonding together two or more layers of protective material. For example, the layers to be bonded can be intumescent layer to intumescent layer, intumescent layer to non-intumescent layer, or non-intumescent layer to non-intumescent layer, depending upon the performance characteristics desired. Historically, the layers have been bonded together using an organic adhesive, which is typically a pressure-sensitive adhesive or a hot melt adhesive film. In general, the process for bonding the layers using a hot melt adhesive has been carried out as follows. First, the organic adhesive film is positioned between the two mat layers. Next, the mat is heated to soften the organic adhesive and passed through a nip to force the layers together. The mat is then allowed to cool.

SUMMARY

We recognize that there are some drawbacks to using an organic hot melt adhesive to bond together the layers of a multilayer mounting mat.

For example, because the adhesive is organic, it decomposes when exposed to relatively high temperatures (for example, temperatures greater than about 200° C.) and can emit obnoxious odors. The most noticeable odor typically occurs during the first few minutes of use of the pollution control device when the mounting mat is first exposed to hot exhaust fumes. The hot exhaust gases burn the organic adhesive creating a foul smell that can be irritating to automotive assembly line workers.

Another potential drawback to using an organic hot melt adhesive to bond together the layers of a multilayer mounting mat is that when the organic adhesive decomposes from exposure to high temperatures, the decomposition results in a loss of mass and volume, which can reduce the holding performance of the mounting mat.

A third potential drawback to using an organic hot melt adhesive to bond together the layers of a multilayer mounting mat is that thermal degradation of the organic adhesive, which causes the adhesive to stiffen and lack resiliency, can occur if the application temperature of the pollution control device is relatively low (for example, less than about 300° C.).

In view of these potential drawbacks, we recognize that there is a need in the art for multilayer mounting mats adhered together using inorganic adhesive.

Briefly, the present invention provides a multilayer mounting mat operatively adapted (i.e., having a dimension, composition and design) for use in mounting a pollution control element in a pollution control device. The mat comprises a first layer, a second layer, and an adhesive sandwiched therebetween so as to bond together a major surface of said first layer to a major surface of said second layer, said adhesive comprising at least one of inorganic colloidal particles having an average diameter less than about 300 nm and an inorganic water-soluble salt.

The layers in the mounting mats of the present invention are bonded together using an inorganic adhesive. Therefore, the drawbacks associated with using an organic adhesive discussed above can be eliminated. In addition, the step of heating the mat to soften the adhesive before compressing the layers together (for example, by passing the mat through a nip) is no longer required when an inorganic adhesive is utilized.

In another aspect, the present invention provides a pollution control device comprising a casing, a pollution control element disposed in the casing, and a multilayer mounting mat according to the present invention positioned between the pollution control element and the casing.

In yet another aspect, the present invention provides a method for making a multilayer mounting mat. The method comprises (a) applying an adhesive comprising at least one of inorganic colloidal particles having an average diameter less than about 300 nm or an inorganic water-soluble salt to a major surface of a first mounting mat layer, and (b) compressing together a major surface of a second mounting mat layer to the adhesive-coated surface of the first mounting layer to form a multilayer mounting mat.

DETAILED DESCRIPTION

Mat Layers

The multilayer mounting mats of the invention include at least two mat layers bonded together by an adhesive. The layers can be made from various materials, including intumescent materials and non-intumescent materials.

As used herein, "non-intumescent" refers to material that exhibits less than about 10 percent free expansion in thickness when heated to temperatures of about 800° C. to about 900° C. Free expansion refers to the amount of expansion in the Z-axis that the material undergoes when heated without constraints. As used herein, "intumescent" refers to a material that can exhibit at least about 10 percent free expansion in thickness under the same conditions.

Intumescent sheet materials can be produced from unexpanded vermiculite, hydrobiotite, or water-swelling tetrasilicic fluorine mica using organic and/or inorganic binders to provide a desirable degree of wet strength (see, for example, U.S. Pat. No. 3,916,057). The sheet material can be produced to desirable thickness by paper making techniques.

Suitable inorganic binders can include, for example, tetrasilicic fluorine mica in either the water-swelling unexchanged form or after flocculation as the exchanged salt with a di- or polyvalent cation as well as fibrous materials. Organic binders may include small amounts of various polymers and elastomers, often added in latex form, as for example, natural or synthetic rubber lattices.

The sheet material can be formed by standard paper making techniques as described, for example, in U.S. Pat. No. 3,458,329 with respect to ceramic convertible papers. From 30 to 85% by weight of intumescent material, preferably unexpanded beneficiated flakes of vermiculite ore, hydrobiotite, or waterswelling synthetic tetrasilicic fluorine type mica can be incorporated in the sheet either alone or in a combination of any of the three materials. Reinforcing agents (from 0 to 60%, but preferably from 5 to about 60%), such as chrysotile, soft glass fibers, refractory filaments including zirconia-silica fibers as described in U.S. Pat. No. 3,709,706, crystalline alumina whiskers and aluminosilicate fibers (available commercially under the tradenames Fiberfrax™ and Kaowool™) or metal filaments can be incorporated in order to provide integrity to the sheet material in the green state as well as in the finished intumescent sheet material and in the exfoliated sheet. From 10 to 70% by weight of inorganic binder is used in preparing the intumescent sheet material such as water-swellable synthetic mica microflakes (see, for example, U.S. Pat. No. 3,001,571), montmorillonite (bentonite, hectorite, or saponite) or kaolinite (ball clay). Synthetic mica, which can also be included as a component for other properties, possesses a sufficient ability at interlocking or conforming to other particles that are present that it can also serve in the second capacity as inorganic binder.

When synthetic mica is utilized as a binder, solution is prepared from unexchanged synthetic tetrasilicic fluorine mica or a suspension of exchanged synthetic mica may also be used. Concentrations may be varied over wide ranges up to 20% by weight or more. Synthetic tetrasilicic fluorine mica can be used as a binder in one of the other of two forms. If the unexchanged mica is used (that is, usually the sodium or lithium form), flocculation is initiated by the addition of salts of divalent or trivalent cations, such as aqueous solutions of $Ba(NO_3)_2$, $BaCl_2$, $Al_2(SO_4)_3$, $Al(NO_3)_3$. On the other hand, if the exchanged mica (for example, $Ba^{++}$, $K^{+Ca+++}$, $Mg^{++}$, $Sr^{++}$, $Pb^{++}$, $Al^{+++}$, etc.) is used, flocculation is best achieved with non-ionic polyelectrolytes such as polyethylene imine or polyacrylamides. Small amounts of organic or inorganic fibrous materials may be added to impart additional green strength to the green sheet material. The intumescent material, one or more reinforcing agents and binder are blended together followed by the flocculating agents. A small amount of surfactants or foaming agents may also be employed in order to improve the dispersion of the intumescent material without going beyond the scope of the invention. The sheet is conveniently formed by standard paper making techniques either in a handsheet former on Fourdrinier screens although other methods can also be used. The resulting green sheet is dried at about 90° C. to form a handleable, flexible, resilient, intumescent sheet material.

Intumescent sheet materials can also be produced from refractory ceramic fibers, for example, as described in U.S. Pat. Nos. 4,929,429 and 5,028,397. The refractory ceramic fibers can be made from an aqueous solution or a colloidal dispersion that is called an "organosol" or a "sol gel". Refractory ceramic fibers formed by sol gel processes can be either crystalline or amorphous, depending upon the temperature at which they are fired.

Alternatively, refractory ceramic fibers can be melt-formed and annealed in order to provide greater resiliency, for example, as described in U.S. Pat. No. 5,250,269. Melt-formed refractory ceramic fibers can be annealed to develop a fine-grained crystalline form while avoiding higher temperatures that could result in a coarse-grained structure.

A mat layer comprising refractory fibers that are melt-formed and annealed as in U.S. Pat. No. 5,250,269 is preferably free from materials other than annealed, melt-formed refractory ceramic fibers and preferably has only a minor proportion of binder that provides sufficient integrity to the mat layer to enable it to be handled. A binder can be avoided by wet-laying the fibers to align most of the fibers in the plane of the mat layer.

The melt-formed refractory ceramic fibers can be melt-blown or melt-spun form a variety of metal oxides, preferably a mixture of $Al_2O_3$ and $SiO_2$ having from about 30 to about 70 percent by weight of alumina and from about 70 to about 30 percent by weight of silica, preferably about equal parts by weight. The mixture can include other oxides such as $B_2O_3$, $P_2O_5$, and $ZrO_2$.

Melt-formed refractory ceramic fibers that can be used to make intumescent mat layers are available from a number of commercial sources and include these known under the trade designation Fiberfrax™ from Unifrax Corp., Niagara Falls, N.Y.; Cerafiber™ and Kaowool™ from Thermal Ceramics Co., Augusta, Ga.; Cer-wool™ from Thermal Ceramics, Erwin, Tenn.; and SNSC™ from Shin-Nippon Steel Chemical of Tokyo, Japan. The manufacturer of ceramic fibers known under the trade designation Cer-wool™ states that they are melt-spun from a mixture of by weight 48% silica and 52% alumina and have an average fiber diameter of 3-4 micrometers. The manufacturer of ceramic fibers known under the trade designation Cerafiber™ states that they are melt-spun from a mixture of by weight 54% silica and 46% alumina and have an average fiber diameter of 2.5-3.5 micrometers. The manufacturer of ceramic fibers SNSC 1260-D1 states that they are melt-formed from a mixture of by weight 54% silica and 46% alumina and have an average fiber diameter of about 2 micrometers. The individual ceramic fibers of the mat layer preferably are from 2 to 8 micrometers in diameter.

Intumescent sheet materials with glass fibers such as those described in U.S. Pat. No. 5,523,059 can also be useful as mat layers. These materials typically comprise from about 25% to about 60% by weight of ceramic fibers, from about 25% to about 60% by weight of at least one unexpanded intumescent material, about 0.1% to about 5% by weight of glass fibers having a diameter less than about 2.0 micrometers, and from about 0.1 to about 15% organic binder.

The mat layers can be formed by known wet-laid or papermaking processes. The composition typically contains a large mount of water (for example, greater than 95% water), with the solids well-dispersed with the mixture. The mixture is then quickly poured onto a screen and drained to form mats, which are then dried.

The glass fibers useful in making these mat layers can be glass microfibers having a diameter less than about 2.0 micrometers. Suitable glasses include borosilcate glasses such as calcium aluminoborosilicate, magnesium aluminoborosilicate, and alkali (for example, sodium and potassium) borosilicate. Preferably, the fibers are made from alkali borosilicate glass. The term "glass" as used herein refers to an amorphous (that is, a material having a diffuse x-ray diffraction pattern without definite lines to indicate the presence of a crystalline phase) inorganic oxide material. Suitable glass fibers have a softening point near the temperature of use. This temperature is typically below about 900° C., preferably below about 850° C., and most preferably below about 800° C. The term "softening point" refers to the temperature at which a glass in the form of a fiber of uniform diameter elongates at a specific rate under its own weight.

Suitable glass fibers are commercially available under the Micro-Strand™ MicroFibers™ trademark from Schuller Co. The glass fibers can be useful in amounts from about 0.1% to about 5% by weight, and preferably from about 2% to about 4%. When used in amounts greater that about 5%, the fibers can inhibit the draining of the composition in the wet-laid process used in making the mats. Preferably, the glass fibers have a diameter less than about 1 micrometer.

The ceramic fibers provide resiliency and flexibility to sheet materials prior to mounting in a pollution control device, as well as cohesive strength and resiliency to the sheet materials in use at high temperatures. Useful materials for fibers include graphite, alumina-silica, silica, and calcium-silica. Preferred materials include alumina-silica and calcium-silica.

Suitable fibers that are commercially available can include alumino-silicate fibers such as Fiberfrax™ 7000M fibers from Unifrax Corp. of Niagara Falls, N.Y., and Cerafiber™ from Thermal Ceramics of Augusta, Ga.

Suitable intumescent materials include unexpanded vermiculite, vermiculite ore, hydrobiotite, water swellable synthetic tetrasilicic fluorine type mica described in U.S. Pat. No. 3,001,571, alkali metal silicate granules as described in U.S. Pat. No. 4,521,333 (Graham et al.), and expandable graphite. Preferred intumescent materials are unexpanded vermiculite, and vermiculite ore.

Resinous organic binders can be added to improve the resiliency and strength of the sheet materials before and during canning. Suitable organic binder materials include aqueous polymer emulsions, solvent-based polymers, and 100% solids polymers. Aqueous polymer emulsions are organic binders polymers and elastomers in the latex form (for example, natural rubber lattices, styrene-butadiene lattices, butadiene-acrylonitrile lattices, and lattices of acrylate and methacrylate polymers and copolymers). Solvent-based polymeric binders can include a polymer such as an acrylic, a polyurethane, or a rubber-based organic polymer. The 100% solids polymers include natural rubber, styrene-butadiene rubber, and other elastomers.

Preferably, the organic binder material includes an aqueous acrylic emulsion. Acrylic emulsions are preferred because of their aging properties and noncorrosive combustion products. Useful acrylic emulsions include those commercially available under the trade designations Rhoplex™ TR-934 (a 44.5% by weight solids aqueous acrylic emulsion) and Rhoplex™ HA-8 (a 44.5% by weight solids aqueous emulsion of acrylic copolymers) from Rohm and Haas of Philadelphia, Pa. A preferred acrylic emulsion is commercially available under the trade designation Neocryl™ XA-2022 (a 60.5% solids aqueous dispersion of acrylic resin) from ICI Resins US of Wilmington, Mass., and Airflex™ 600BP DEV (55% by weight solids aqueous emulsion of theylene vinyl acetate acrylate terpolymer) from Air Products and Chemicals, Inc., Allentown, Pa.

Organic binder materials can include at least one plasticizer. Plasticizers tend to soften a polymer matrix and can contribute to the flexibility and moldability of the sheet materials made from the composition.

The organic binder materials are typically present in amounts of from about 0.1% to about 15% by dry solids weight, and preferably about 2% to about 10%. The weight of the organic binder materials includes the polymer or copolymer solids and any plasticizer. In highly preferred embodiments, the organic binder is present in amounts of about 4% to about 8% by weight.

Inorganic binder materials, such as clays (for example, sepiolite and bentonite, colloidal silicas and aluminas) and alkali silicates, especially in amounts greater than about 5%, are preferably avoided because they tend to stiffen the sheets and make them less flexible. Inorganic fibers can also make the sheets less resilient.

In making intumescent sheet materials with glass fibers such as those described in U.S. Pat. No. 5,523,059, the ceramic fibers, the glass fibers, the intumescent agents, the organic binder, other fibers, and fillers, can be mixed together. Optionally, water, dispersants, plasticizers, and surfactants can independently be added to aid in mixing the components together and/or to adjust the viscosity of the mixture.

Mat layer compositions can be slurries formed into sheets by traditional wet-laid non-woven papermaking techniques on commercially available equipment such as Fourdrinier machines. Briefly, this process includes pouring the slurry onto a wire mesh or screen, and either applying a vacuum to the screen to remove most of the water or simply allowing the slurry to drain on the screen by gravity. The formed sheet is then pressed and dried to form a resilient mat.

Still other compositions that can be used for making intumescent mat layers can include compositions containing biosoluble inorganic fibers and micaceous binders such as those described in U.S. Patent App. Pub. No. 2004/0234436. These compositions can include biosoluble inorganic fibers in an amount of about 5 to about 90 weight percent on a dry weight basis and micaceous binders in an amount of about 5 to about 80 weight percent on a dry weight basis. The compositions can also optionally include intumescent materials, non-respirable inorganic fibers, polymeric binders, polymeric fibers, or a combination thereof The composition can be prepared free of refractory ceramic fibers that are respirable but durable in a physiological medium.

In some embodiments, the combination of a micaceous binder and biosoluble inorganic fiber can be substituted for all or a portion of the durable refractory fiber content, both respirable and non-respirable, of conventional sheet materials used in various applications such as pollution control devices. In particular, the combination of biosoluble fibers and micaceous binders can be advantageously substituted for the durable, refractory ceramic fibers that are respirable in size.

As used herein, "biosoluble inorganic oxides fibers" refer to inorganic fibers that are decomposable in a physiological medium or a simulated physiological medium. Physiological medium refers to, but is not limited to, those bodily fluids typically found in the respiratory tract such as, for example, the lungs of animals or humans. As used herein, "durable" refers to inorganic fibers that are not biosoluble.

The biosoluble inorganic fibers typically include inorganic oxides such as, for example, $Na_2O$, $K_2O$, CaO, MgO, $P_2O_5$, $Li_2O$, and BaO, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of fibers are typically referred to as calcium magnesium silicate fibers. The calcium magnesium silicate fibers usually contain less than about 10 weight percent aluminum oxide. In some embodiments, the fibers include from about 45 to about 90 weight percent SiO2, up to about 45 weight percent CaO, up to about 35 weight percent MgO, and less than about 10 weight percent Al2O3. For example, the fibers can contain about 55 to about 75 weight percent $SiO_2$, about 25 to about 45 weight percent CaO, about 1 to about 10 weight percent MgO, and less than about 5 weight percent $Al_2O_3$.

Suitable biosoluble inorganic oxides fibers are described in U.S. Pat. Nos. 5,332,699, 5,585,312, 5,714,421, and 5,874,375; and European Patent Application 02078103.5 filed on Jul. 31, 2002. Various methods can be used to form biosoluble inorganic fibers including, but not limited to, sol gel formation, crystal growing processes, and melt forming techniques such as spinning or blowing.

Biosoluble fibers are commercially available from Unifrax Corporation (Niagara Falls, N.Y.) under the trade designation Insulfrax™. Other biosoluble fibers are sold by Thermal Ceramics (located in Augusta, Ga.) under the trade designation Superwool™. For example, Superwool™ 607 contains 60 to 70 weight percent $SiO_2$, 25 to 35 weight percent CaO, 4 to 7 weight percent MgO, and a trace amount of $Al_2O_3$. Superwool™ 607 MAX can be used at a slightly higher temperature and contains 60 to 70 weight percent $SiO_2$, 16 to 22 weight percent CaO, 12 to 19 weight percent MgO, and a trace amount of $Al_2O_3$.

Suitable biosoluble inorganic fibers can have a wide range of average diameters and average lengths. Biosoluble inorganic fibers are commercially available that have an average fiber diameter in the range of about 0.05 micrometers to about 15 micrometers. In some embodiments, the biosoluble inorganic fibers have average fiber diameters in the range of about 0.1 micrometers to about 5 micrometers. As the average diameter of the biosoluble inorganic fibers decreases, an increased amount of the fiber can be incorporated into a given volume of the sheet material resulting in better entrapment of the micaceous binder. Sheet materials prepared having a higher density of fibers tend to have better resiliency and flexibility.

The biosoluble inorganic fibers typically have an average fiber length in the range of about 0.1 centimeters to about 3 centimeters. Generally, the length of the biosoluble inorganic fibers is not critical as any selected fiber(s) can be broken down into smaller lengths during the manufacturing process, if desired.

As used herein, the phrase "micaceous mineral" refers to a family of minerals that can be split or otherwise separated into planar sheets or platelets. Micaceous minerals include, but are not limited to, expanded vermiculite, unexpanded vermiculite, and mica micaceous minerals typically have an average aspect ratio (that is, the length of a particle divided by its thickness) that is greater than about 3.

As used herein, "micaceous binder" refers to one or more micaceous minerals that can be wetted and then dried to form a cohesive body that is self-supporting. As used herein, "self-supporting" refers to a micaceous binder that can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

Micaceous binders include micaceous minerals that typically have a particle size less than about 150 micrometers (for example, the micaceous binder contains micaceous minerals that can pass through a 100 mesh screen). In some embodiments, the micaceous binder contains micaceous minerals having a size less than about 150 micrometers and having an average aspect ratio of greater than about 8 or greater than about 10.

The micaceous binder can be non-intumescent, intumescent, or a combination thereof. In some embodiments, the micaceous binder includes processed vermiculites (that is, vermiculate that has been expanded, delaminated, and crushed). Processed vermiculite is typically non-intumescent. In other embodiments, the micaceous binder includes vermiculite that has not been expanded and delaminated or that has been only partially expanded and delaminated. Such materials tend to be intumescent.

Suitable micaceous binders are commercially available from W. R. Grace & Company, and include a delaminated vermiculite powder (under the trade designation VFPS™) and an aqueous dispersion of chemically exfoliated vermiculite (under the trade designation Microlite™). Also, expanded vermiculite flakes are available from W. R. Grace and Company (under the trade designation Zonelite™ #5) that can be reduced in particle size to form a micaceous binder.

The amount of biosoluble inorganic fiber and micaceous binder included in sheet materials can vary within a wide range. The biosoluble inorganic fibers are typically present in an amount to ensure that the resultant sheet material has the desired degree of flexibility and handling characteristics. Flexible sheet materials facilitate wrapping the sheet material around a pollution control element during the canning process. However, if too much biosoluble inorganic fiber is used, the mounting mat or sheet material may shrink more than is desired upon heating.

Balancing these concerns, compositions containing biosoluble inorganic fibers and micaceous binders typically contain up to about 90 weight percent of the biosoluble inorganic fibers on a dry weight basis. In some embodiments, the compositions include up to about 85 percent, up to about 80 percent, up to about 60 weight percent, up to about 40 weight percent, or up to about 30 weight percent of the biosoluble fibers on a dry weight basis.

The dry weight of the composition refers to the weight of the solids in the composition. Thus, when the composition is in the form of a sheet material, the dry weight refers to the final weight after drying the sheet material to remove all water and solvents. When the composition is in the form of a slurry or paste, the dry weight is the total weight minus the weight of water and any other solvents. That is, the dry basis weight includes the weight of the biosoluble fibers, the micaceous binder, and other solids such as the solids from polymeric binder, polymeric fiber, intumescent materials, non-respirable inorganic fibers, etc. The dry basis weight typically does not include other materials that can result in some solids in miniscule amounts (for example, less than about 0.5 weight percent of the dry basis weight of the mat) such as defoaming agents, coagulating agents, and surfactants. Large portions of these materials tend to remain in solution and are drained with the water during the process of making the sheet materials.

The compositions typically include at least about 5 weight percent biosoluble inorganic fibers on a dry weight basis. In some embodiments, the compositions includes at least about 10 weight percent or at least about 15 weight percent of the biosoluble inorganic fibers on a dry weight basis. The biosoluble inorganic fibers are typically included in the composition in an amount in the range of about 5 to about 90 weight percent, in the range of about 5 to about 85 weight percent, in the range of about 5 to about 80 weight percent, in the range of about 10 to about 60 weight percent, in the range of about 15 to about 40 weight percent, or in the range of about 15 to about 30 weight percent on a dry weight basis.

The compositions typically include up to about 80 weight percent micaceous binder on a dry weight basis. In some embodiments, the compositions include up to about 60 percent, up to about 50 percent, or up to about 45 weight percent of the micaceous binder on a dry weight basis. The compositions typically include at least about 5 weight percent micaceous binder based on the total dry weight of the composition. In some embodiments, the composition includes at least about 10 weight percent, or at least about 15 weight percent micaceous binder on a dry weight basis. The micaceous binder is typically present in the composition in an amount in the range of about 5 to about 80 weigh percent, in the range of about 10 to about 60 weight percent, in the range of about 15 to about 50 weight percent, or in the range of about 15 to about 45 weight percent on a dry weight basis.

Sheet materials formed from the compositions containing biosoluble inorganic fibers and micaceous binders described above using expanded, delaminated, and crushed vermiculite can be substantially non-intumescent. Using unexpanded vermiculite dust can result in a greater amount of free expansion along the Z-axis, depending upon the amount of unexpanded vermiculite used. Whether prepared using a non-intumescent or an intumescent micaceous binder, the sheet materials typically exhibit shrinkage of less than about 6 percent in the X-Y plane of the sheet. In some embodiments, the shrinkage in the X-Y plane is less than about 5 percent.

The compositions can optionally include non-respirable inorganic fibers. The non-respirable fibers can be biosoluble or can be durable. Non-respirable inorganic fibers that are durable can include, for example, ceramic materials such as ceramic oxides, ceramic nitrides, glass materials, or a combination thereof The term "glass", as used herein, refers to an amorphous, inorganic material such as an oxide having a diffuse x-ray diffraction pattern at least substantially without definite lines or other indicia of a crystalline phase.

If the fibers are longer than desired when obtained from a desired source, the fibers can be chopped, cut, or otherwise processed to reduce the fiber length to a desired length. The fibers typically have an average length in the range of about 0.1 cm to about 1 cm.

The amount of non-respirable inorganic fiber incorporated into the composition can vary over a wide range. As a general guideline, compositions can include up to about 15 weight percent non-respirable inorganic fibers on a dry weight basis. In some embodiments, the compositions contains up to about 10 weight percent, up to about 5 weight percent, or up to about 3 weight percent of the non-respirable inorganic fibers on a dry weight basis.

The compositions containing biosoluble inorganic fibers and micaceous binders can also include intumescent, inorganic materials having an average particle size greater than about 300 micrometers. In some embodiments, the intumescent material is micaceous and has a particle size greater than 150 micrometers (that is, the particles do not pass through a 100 mesh screen). That is, when the intumescent material is micaceous, any particles smaller than about 150 micrometers are considered a micaceous binder.

Examples of suitable intumescent, inorganic materials having an average particle size greater than about 300 micrometers include unexpanded vermiculite, vermiculite ore, hydrobiotite, water swellable synthetic tetrasilicic fluorine type mica described in U.S. Pat. No. 3,001,571, alkali metal silicate granules as described in U.S. Pat. No. 4,521,333, expandable graphite, combinations of these, and the like. Some of these intumescent materials can exhibit more than 10 percent free expansion in thickness when heated to temperatures above about 200° C. or about 300° C. Additionally, some of these intumescent materials can exhibit more than about 50 percent free expansion when heated.

The amount of intumescent material having an average particle size greater than about 300 micrometers included in the compositions can vary over a wide range. If too little intumescent material is present, the composition may expand less than desired. On the other hand, if too much intumescent material is used, the composition may expand too much when heated.

Balancing these concerns, compositions generally include up to about 80 weight percent, up to about 70 weight percent, or up to about 60 weight percent intumescent material having an average particle size greater than about 300 micrometers. In some embodiments, the compositions include about 10 to about 80 weight percent, about 20 to about 70 weight percent, about 30 to about 60 weight percent, or about 40 to about 60 weight percent of the intumescent material having an average particle size greater than about 300 micrometers. The weight percent is based on the dry weight of the composition.

For example, the composition can include micaceous binder in an amount of about 5 to about 80 weight percent on a dry weight basis, biosoluble inorganic fibers in an amount of about 5 to about 80 weight percent on a dry weight basis, and intumescent material in an amount of about 10 to about 80 weight percent on a dry weight basis. The micaceous binder can include vermiculite having a particle size less than about 150 micrometers and the intumescent material can include vermiculite having a particle size greater than about 150 micrometers (none passes through a 100 mesh screen). The intumescent vermiculite can have an average particle size that is greater than about 300 micrometers.

Compositions containing biosoluble inorganic fibers and micaceous binders can also include one or more polymeric binders. The polymeric binder can be used to provide added resiliency and flexibility during formation and during handling of the compositions. Suitable polymeric binders can be thermoplastic or thermoset and can be provided as a 100 percent solids composition, a solution, a dispersion, a latex, an emulsion, combinations of these, and the like. In some embodiments, the polymeric binder is an elastomer. Suitable polymers include, but are not limited to, natural rubber, copolymers of two or more copolymerizable species including styrene and butadiene, copolymers of two or more copolymerizable species including butadiene and acrylonitrile, (meth)acrylate polymers and copolymers, polyurethanes, polyesters, polyamides, cellulosic polymers, other elastomer polymers, or combinations of these. The compositions can include about 0.1 to about 15 weight percent, about 0.5 to about 12 weight percent, or about 1 to about 10 weight percent of the polymeric binder on a dry weight basis.

In some embodiments, the polymer binders are acrylic- and/or methacrylate-containing latex compositions. Such latex compositions tend to burn cleanly without producing undesirable amounts of toxic or corrosive by-products. Examples of suitable acrylic emulsions include those commercially available under the trade designations Rhoplex™ HA-8 (a 44.5% by weight solids aqueous emulsion of acrylic copolymers) from Rohm and Haas of Philadelphia, Pa. and under the trade designation Airflex™ 600BP (a 55% solids ethylene vinyl acetate copolymer) from Air Products of Allentown, Pa.

Polymeric fibers optionally can be included in the compositions to improve the handling, flexibility, the resiliency, or a combination thereof When the compositions are in the form of a sheet material, polymeric fibers tend to enhance processing and improve the wet strength of the sheet material. The polymer fibers can be formed from any of the polymers listed above with respect to the polymeric binder. The compositions can include up to about 5 weight percent polymeric fibers on a dry weight basis. In some embodiments, the compositions includes up to about 2 or up to about 1 weight percent polymeric fiber. For example, the compositions can include about 0.1 to about 2 weight percent or about 0.2 to about 1.0 weight percent of polymeric fibers on a dry weight basis. The polymeric fibers may be staple fibers or fibrillated fibers. In one embodiment, the polymeric fibers are staple fibers in the range of about 0.5 to about 5 denier.

The compositions can also include other materials in accordance with conventional practices. Such materials include, for example, plasticizers, wetting agents, defoaming agents, latex coagulants, clays, lightweight fillers, refractory fillers, metallic fibers, or combinations of these.

Sheet materials prepared from compositions containing biosoluble inorganic fibers and micaceous binders can be formed using any of a variety of suitable techniques such as, for example, a papermaking process. In one embodiment of a papermaking approach, a micaceous binder is prepared by adding expanded micaceous mineral(s) to water. The concentration and temperature can both vary over a wide range. In some embodiments, warm water, such as water at a temperature of about 30° C. to about 75° C., can be used to prepare the slurry. For example, the water can be at a temperature of about 35° C. to about 45° C. The mineral is delaminated (that is, exfoliated) and crushed to a particle size suitable for a binder (that is, less than about 150 micrometers).

A dilute slurry can be prepared by adding water to the micaceous binder. Biosoluble inorganic fibers and optionally other inorganic and polymeric fiber constituents can be added to the slurry. Any amount of shear that disperses the micaceous binder and biosoluble fibers can be used. In some embodiments, low to moderate shear for a relatively brief time, for example, 1 second to 10 minutes or about 3 to 80 seconds, can be used to disperse the fibers. The slurry can be mixed at moderate speed to keep the solid ingredients suspended. Other ingredients such as a defoaming agent and polymeric binders can be added.

A suitable coagulating agent such as an acidifying agent can be added. Other coagulating agents, such as one that can cause coagulation via basic means, can also be used in accordance with conventional practices. During coagulation, larger particles of the polymeric binder typically formed. The fines and other particulate matter tend to be bound to the polymeric binder and trapped in the fiber matrix. That is, the fines do not cause clogging of screens used for filtering. Binding the fines to the fiber matrix facilities draining the water from the slurry and can decrease the processing time needed to prepare sheet material.

The optional intumescent material having an average particle size greater than about 300 micrometers is typically added after coagulation. This particular order of addition can also facilitate dispersing the solids in the slurry and removing the water from the slurry. However, the order of addition is not critical and other orders of addition can be acceptable.

The resultant slurry composition can be cast onto a suitable screen, drained, and pressed. Alternatively, the plies can be formed by vacuum casting the slurry onto a wire mesh or screen. The resultant pressed sheet material can be dried in any suitable manner, for example, air dried or oven dried. A more detailed description of the standard paper making techniques employed can be found, for example, in U.S. Pat. No. 3,458,329.

Mat layers can also be, for example, a fibrous mat of essentially shot-free ceramic fibers such as the fibrous mats described in U.S. Pat. No. 5,028,397. As used herein, "shot-free" refers to a fiber mass containing essentially no particulate ceramic (shot).

Shot-free ceramic fibers using in forming such fibrous mats include those commercially available under the tradenames Fibermax™ fiber, Maftec™ fiber and Saffil™ fiber.

When compressed to a mount density of between 0.21 and 0.50 g/cm$^3$, these mat layers have the unique ability to repeatedly undergo a reduction in thickness while hot and spring back to substantially their original thickness when cooled, thus continually exerting a substantial holding force to a pollution control element. Because of the low density and bulky nature of shot-free ceramic fibers and the fact that they must normally be compressed by about a factor of 10 to get the desired mount density, it can be useful to sew or stitch-bond these materials with an organic thread to form a compressed mat that is closer to its ultimate thickness in use.

Nonwoven mat layers comprising shot-free magnesium aluminoilicate glass fibers such as those described in U.S. Pat. No. 5,290,522 can also be useful in the multilayer mounting mats of the invention. Such nonwoven mat layers typically comprise at least about 60 percent by weight of the shot-free, high strength, magnesium aluminosilicate glass fibers, preferably, at least 90 percent by weight, based on the total weight of the mat layer.

The shot-free, high strength magnesium aluminosilicate glass fibers preferably have a diameter in the range from greater than 5 to about 20 micrometers. Fibers having a diameter greater than about 20 can be useful but can be difficult to form into a nonwoven mat.

The shot-free magnesium aluminoborosilicate glass fibers typically have an average tensile strength in the range from about 2800 MPa (400,000 psi) to about 4200 MPa (600,000 psi).

Although the continuous fibers used to prepare the nonwoven mat can be sized or unsized (that is, essentially free of size), the fibers are preferably sized. Typically, continuous fibers are treated with organic sizing during their manufacture to provide lubricity and to protect the fiber strands during handling. It is believed that the sizing tends to reduce the breakage of fibers, hold individual fibers together in a tow, and reduce the amount of dust produced during the needle punching or other handling steps involved in making the nonwoven mat. Conventional sizing materials include dextrinized starch gum, gelatin, polyvinyl alcohol, hydrogenated vegetable oils, and non-ionic detergents.

Suitable shot-free, high strength, magnesium aluminosilicate glass fibers are known in the art and include those commercially available, for example, under the trade designation S2-GLASS™ from the Owens Corning Corp. of Granville, Ohio.

Nonwoven mat layers comprising shot-free magnesium aluminoilicate glass fibers can further comprise high strength (that is, an average tensile strength greater than 700 MPa (100,000 psi), preferably greater than about 1200 MPa (200,000 psi), more preferably, greater than about 1800 MPa (300,000 psi), and, most preferably, greater than about 2100 MPa (350,000 psi) fiber (preferably, sized) selected from the group of fibers consisting of ceramic oxide fibers other than magnesium aluminosilicate glass fibers (for example, aluminosilicate fibers (including aluminoborosilicate fibers) and quartz fibers (including crystalline quartz fibers)), alumina fibers, carbon fibers, silicon carbide fibers, silicon nitride fibers, and metal fibers. Sized aluminoborosilicate fibers are commercially available, for example, under the trade designations Nextel™ 312, Nextel™ 440, and Nextel™ 480 from 3M Company. Further, suitable aluminoborosilicate fibers can be made as disclosed, for example, in U.S. Pat. No. 3,795,524.

Sized aluminosilicate fibers are commercially available, for example, under the trade designation Nextel™ 550 from 3M Company. Further, suitable aluminosilicate fibers can be made as disclosed, for example, in U.S. Pat. No. 4,047,965.

Sized quartz fibers are commercially available, for example, under the trade designations Astroquartz™ from J. P. Stevens, Inc., of Slater, N.C. Silicon carbide fibers are commercially available, for example, under the trade designations Nicalon™ from Nippon Carbon of Tokyo, Japan; Nicalon™ from Dow Corning of Midland, Mich.; and Tyranno™ from Textron Specialty Materials of Lowell, Mass.

Silicon nitride fibers are available, for example, from Toren Energy International Corp. of New York, N.Y.

Carbon (for example, graphite) fibers are commercially available, for example, under the trade designation IM7 from Hercules Advanced Material & Systems of Magna, Utah.

Stainless steel fibers are commercially available, for example, under the trade designation Bekinox™ from Bekaert of Zweregan, Belgium.

Nonwoven mat layers comprising shot-free magnesium aluminoilicate glass fibers can further comprise fugitive material (for example, heat fugitive materials such as thermoplastic, nylon, and rayon fibers, powders, films, and webs, and water soluble materials such as polyvinyl alcohol). Preferably, the nonwoven mat comprises less than about 15 percent by weight (preferably, less than about 10 percent by weight) fugitive material, based on the total weight of the nonwoven mat. Thermoplastic fibers, for example, are known in the art and are commercially available, for example, from Hoechst-Celanese of Summit, N.J. Thermoplastic fibers can be useful, for example, to bond, when sufficiently heated, to ceramic fibers to aid in holding the mat layer together and to increase the mat layer's handleability. Further, heat fugitive fibers can be burned out of the mat to provide a desired structure or porosity.

To provide individualized (that is, separate each fiber from each other) fibers, a tow or yarn of fibers can be chopped, for example, using a glass roving cutter, to the desired length (typically in the range from about 0.5 to about 15 cm).

The cut or chopped fibers can be separated by passing them through a conventional hammer mill, preferably a blow discharge hammer mill. Typically, the chopped fibers are passed through the hammer mill at least twice. Preferably, at least about 50 percent by weight of the fibers are individualized before they are formed into a nonwoven mat layer. To facilitate processing and separation of the chopped or cut fibers with minimal breakage an antistatic lubricant can be sprayed into the hammer mill while the fibers are being separated.

In a method for making the nonwoven mat layer, chopped, individualized fibers (preferably, about 2.5 to about 5 cm in length) are fed into a conventional web-forming machine, wherein the fibers are drawn onto a wire screen or mesh belt (for example, a metal or nylon belt). To facilitate ease of handling of the mat, the mat can be formed on or placed on a scrim. Depending upon the length of the fibers, the resulting mat layer typically has sufficient handleability to be transferred to a needle punch machine without the need for a support (for example, a scrim).

The nonwoven mat layer can also be made using conventional wet-forming or textile carding. For wet forming processes, the fiber length is preferably about 0.5 to about 6 cm. For textile processes, the fiber length is preferably about 5 to about 10 cm.

A needle-punched nonwoven mat layer refers to a mat layer wherein there is physical entanglement of fibers provided by multiple full or partial (preferably, full) penetration of the mat layer, for example, by barb needles. The nonwoven mat layer can be needle punched using a conventional needle punching apparatus to provide a needle-punched, nonwoven mat layer. Needle punching, which provides entanglement of the fibers, typically involves compressing the mat and then punching and drawing barbed needles through the mat. The optimum number of needle punches per area of mat will vary depending on the particular application. Typically, the nonwoven mat layer is needle punched to provide about 5 to about 60 needle punches/cm$^2$. Preferably, the mat layer is needle punched to provide about 10 to about 20 needle punches/cm$^2$.

Preferably, the needle-punched, nonwoven mat layer has a weight per unit area value in the range from about 1000 to about 3000 g/m$^2$, and in another aspect a thickness in the range from about 0.5 to about 3 centimeters.

The nonwoven mat layer can be stitchbonded using conventional techniques (see, for example, U.S. Pat. No. 4,181,514). Typically, the mat layer is stitchbonded with organic thread. A thin layer of an organic or inorganic sheet material can be placed on either or both sides of the mat during stitchbonding to prevent or minimize the threads from cutting through the mat. Where it is desired that the stitching thread not decompose in use, an inorganic thread, such as ceramic or metal (for example, stainless steel) can be used. The spacing of the stitches is usually from 3 to 30 mm so that the fibers are uniformly compressed throughout the entire area of the mat layer.

Other useful flexible nonwoven mat layers are described, for example, in U.S. Pat. No. 5,380,580. These flexible nonwoven mat layers comprise shot-free ceramic oxide fibers.

It can be desirable for at least a portion of the shot-free ceramic oxide fibers to be physically entangled. The physically entangled fibers become locked into place and form a cohesive region without the need for binder or further support (for example, a scrim). The fibers turn and wind about one another in an interlocking arrangement.

The shot-free ceramic oxide fibers preferably have a diameter in the range from greater than about 5 to about 20 micrometers. Fibers having a diameter greater than about 20 micrometers can be useful but can be difficult to form into a nonwoven mat layer.

The shot-free ceramic oxide fibers, which typically have an average tensile strength greater than about 700 MPa (100,000 psi), preferably have a length of at least about 1.9 cm. Preferably, the shot-free ceramic oxide fibers have an average tensile strength greater than about 1200 MPa (200,000 psi), more preferably, greater than about 1800 MPa (300,000 psi), and most preferably, greater than about 2100 MPa (350,000 psi).

High strength fibers are typically available in continuous tows (also referred to as rovings) or yarns. The tows or strands typically comprise about 780 to about 7800 individual strands of ceramic oxide fibers. The yarns are usually twisted.

Although the continuous fibers used to prepare the flexible nonwoven mat layer can be sized or unsized (that is, essentially free of size), the fibers are preferably sized. Typically, continuous fibers are treated with organic sizing material during their manufacture to provide lubricity and to protect the fiber strands during handling. It is believed that the sizing tends to reduce the breakage of fibers, reduces static electricity, and reduces the amount of dust produced during physical entanglement or other handling steps involved in making the nonwoven mat layer. The sizing can be removed, for example, after formation of the mat layer by dissolving or burning it away.

Conventional sizing materials include dextrinized starch gum, gelatin, polyvinyl alcohol, hydrogenated vegetable oils, and non-ionic detergents. A preferred sizing composition which is applied to the crystalline ceramic fibers contains about 90 percent by weight deionized water, 8 percent by weight of polyethylene imine (commercially available, for example, under the trade designation SC-62J from Morton International of Chicago, IL.), about 1-2 percent by weight polyethylene glycol (commercially available, for example, under the trade designation Carbowax™ 60 from Union Carbide of Danbury, Conn.), and about 0.1 percent by weight of a red dye (commercially available, for example, under the trade designation Pontamine™ Fast Scarlet 4B from Mobay Chemical Co. of Union, N.J.).

Preferred aluminosilicate fibers, which are typically crystalline, comprise aluminum oxide in the range from about 67 to about 77 percent by weight and silicon oxide in the range from about 33 to about 23 percent by weight. Sized aluminosilicate fibers are commercially available, for example, under the trade designation Nextel™ 550 from 3M Company. Further, suitable aluminosilicate fibers can be made as disclosed, for example, in U.S. Pat. No. 4,047,965.

The aluminoborosilicate fibers preferably comprise aluminum oxide in the range from about 55 to about 75 percent by weight, silicon oxide in the range from less than about 45 to greater than zero (preferably, less than 44 to greater than zero) percent by weight, and boron oxide in the range from less than about 25 to greater than zero (preferably, about 1 to about 5) percent by weight (calculated on a theoretical oxide basis as $Al_2O_3$, $SiO_2$, and $B_2O_3$, respectively). The aluminoborosilicate fibers preferably are at least about 50 percent by weight crystalline, more preferably, at least about 75 percent, and most preferably, about 100% (that is, crystalline fibers). Sized aluminoborosilicate fibers are commercially available, for example, under the trade designations Nextel™ 312 and Nextel™ 440 from 3M Company. Further, suitable aluminoborosilicate fibers can be made as disclosed, for example, in U.S. Pat. No. 3,795,524.

Sized quartz fibers are commercially available, for example, under the trade designations Astroquartz™ from J. P. Stevens, Inc., of Slater, N.C.

The flexible nonwoven mat layers disclosed in U.S. Pat. No. 5,380,580 can further comprise up to 40 percent by weight high strength fiber (preferably, sized) (based on the total weight of the nonwoven mat layer) selected from the group of fibers consisting of silicon carbide fibers (commercially available, for example, under the trade designations Nicalon™ from Nippon Carbon of Tokyo, Japan, or Dow Coming of Midland, Mich.; and Tyranno™ from Textron Specialty Materials of Lowell, Mass.), carbon (for example, graphite) fibers (commercially available, for example, under the trade designation IM7 from Hercules Advanced Material and Systems of Magna, Utah), silicon nitride fibers (available, for example, from Toren Energy International Corp. of New York, N.Y.), glass fibers (such as magnesium aluminosilicate glass fibers (commercially available, for example, under the trade designation S2-Glass™ from Owens Corning Corp. of Granville, Ohio)), metal fibers (for example, stainless steel fibers (commercially available, for example, under the trade designation Bekinox™ from Bekaert of Zweregan, Belgium)), and mixtures thereof Metal fibers can be useful, for example, as a resistance heater, or can be used to fuse the mat to a metal surface. The use of fibers such as those made of glass can lower the overall cost of the flexible nonwoven mat layer.

The flexible nonwoven mat layer can further comprise up to about 25 percent by weight (based on the total weight of the mat layer) fugitive material (for example, heat fugitive materials such as thermoplastic, nylon, and rayon fibers, powders, films, and webs, and water soluble materials such as polyvinyl alcohol). Thermoplastic fibers, for example, are known in the art and are commercially available, for example, from Hoechst-Celanese of Summit, N.J. Thermoplastic fibers can be useful, for example, to bond, when sufficiently heated, to ceramic fibers comprising the mat layer to aid in holding the mat together and to increase the mat handleability. Further, fugitive fibers can be burned or dissolved out of the mat layer to provide a desired structure or porosity. Fugitive materials can be incorporated during formation of the flexible nonwoven mat layer. Fugitive materials can also be incorporated into the flexible nonwoven mat layer by soaking or spraying the mat with fugitive material.

Binders can be incorporated into the flexible nonwoven mat layer, for example, by saturating or spraying the mat with binder.

To provide individualized (that is, separate each fiber from each other) fibers, a tow or yarn of fibers can be chopped, for example, using a glass roving cutter, to the desired length (typically in the range from about 1.9 to about 15 cm). For nonwoven mat layers that are to be hydroentangled, it is preferred to partially individualize or separate the cut fibers using a conventional web-forming machine.

The cut or chopped aluminosilicate-based and/or quartz fibers can be separated or individualized using mechanical means such as passing them through a conventional hammer mill, or through a mini-waste opener. If a hammer mill is used, it is desirable for the chopped fibers to be passed through it at least twice.

Preferably, at least 50 percent by weight of the fibers are individualized before they are formed into a nonwoven mat layer. Although cut or chopped fibers greater than about 15 cm can also be useful in preparing the nonwoven mat layer, they can be more difficult to process. Separation of the fibers tends to increase the loftiness (that is, decrease the bulk density) of the fibers making up the nonwoven mat layer, thereby lowering the density of the resulting mat layer.

To facilitate processing and separation of the chopped or cut fibers, the fibers and the separation equipment are preferably conditioned at about 60-85 percent (more preferably, about 80-85 percent) relative humidity. Alternatively, an antistatic lubricant (for example, such as that commercially available under the trade designation Neutrostat™ from Simco Co., Inc., of Hatfield, N.J.) or a light weight hydrocarbon oil (for example, such as that commercially available under the trade designation 702ETL from Moroil Corporation of Charlotte, N.C.) can be coated onto the fibers and/or sprayed into the fiber separation equipment while the fibers are being separated.

The chopped, individualized fibers can then be fed, preferably using a conventional fiber feeding system into a conventional web-forming machine, wherein the fibers are drawn onto a wire screen or mesh belt (for example, a metal or nylon belt). Fibers having a length greater than about 2.5 cm tend to become entangled during the web formation process. To facilitate ease of handling of the mat layer, the mat layer can be formed on or placed on a scrim. Depending upon the length of the fibers, the resulting mat layer may have sufficient handleability to be transferred to physical entanglement equipment (for example, a needle-punching machine or a hydroentanglement unit) without the need for a support (for example, a scrim).

The nonwoven mat layer can then be needle punched and/or hydroentangled. The nonwoven mat layer can be needle punched using a conventional needle-punching apparatus. Needle punching, which provides entanglement of the fibers, typically involves punching and drawing barbed needles through the mat. Typically, a nonwoven mat layer to be needle punched is at least about 0.3175 cm (1/8 inch) thick. Mat layers below this thickness tend to have insufficient integrity to be needle punched. The optimum number of needle punches per area of mat will vary depending on the particular application. Typically, the nonwoven mat layer is needle punched to provide an average of at least 5 needle punches/cm$^2$. Preferably, the mat is needle punched to provide an average of about 5 to 60 needle punches/cm$^2$, more preferably, an average of about 10 to about 20 needle punches/cm$^2$.

The nonwoven mat layer can be hydroentangled using a conventional water entangling unit (see, for example, U.S. Pat. No. 4,880,168). Although the preferred liquid to use with the hydroentangler is water, other suitable liquids may be used with or in place of the water. Preferably, the nonwoven mat layer is wet with the liquid before it is subjected to hydroentanglement. Preferably, a nonwoven mat layer is pre-wet, for example, by passing it under a liquid (for example, water) stream at low water pressure (for example, up to about 350 kPa (50 psi)) before hydroentanglement. The pre-wet mat layer is then subjected to high jet stream pressure.

Typically, a nonwoven mat layer to be hydroentangled is at least about 0.08 cm (1/32 inch) thick. Mat layers below this thickness tend to have insufficient integrity to be hydroentangled. Mat layers thicker than about 0.63 cm (1/4 inch) are typically not hydroentangled through their full thickness. Such thick mats, however, can be further hydroentangled by subjecting both major surfaces of the mat to the jets (that is, to the hydroentangling process).

Preferably, the flexible, needle-punched, nonwoven mat layers described in U.S. Pat. No. 5,380,580 have a weight per unit area value in the range from about 50 to about 5000 g/m$^2$, and in another aspect a thickness in the range from about 0.3 to about 5 centimeters. Preferably, a flexible, hydroentangled, nonwoven mat layer has a weight per unit area value in the range from about 25 to about 250 g/m$^2$, and in another aspect a thickness in the range from about 0.08 cm (1/32 inch) to about 0.32 cm (1/8 inch).

Adhesive

In the multilayer mounting mat of the present invention, mat layers are bonded together with an adhesive comprising at least one of inorganic colloidal particles and an inorganic water-soluble salt.

Useful inorganic colloidal particles typically have an average diameter less than about 300 nm (preferably, less than about 200 nm; more preferably, less than about 100 nm). Suitable inorganic colloidal particles include, for example, colloidal silica, colloidal alumina, colloidal clays (natural or synthetic), and mixtures thereof Preferred inorganic colloidal particles include, for example, colloidal silica and colloidal clay. More preferred inorganic colloidal particles include, for example, colloidal silica and synthetic colloidal clay.

Useful colloidal silica is available commercially, for example, from Nalco in Naperville, Ill. (for example, as Nalco 1056, 2329, 2327, 1130, or 1030 colloidal silica) and as Ludox PW 50EC from W.R. Grace in Columbia, Md. Typically, the colloidal silica is between about 30% and about 50% solids in water. The colloidal silica can have a positive or a negative charge (preferably, negative).

Useful colloidal clays are also available commercially, and can include, for example, Laponite™ (59.5% $SiO_2$, 27.5% MgO) from Rockwood in Princeton, N.J.; Mineral colloid BP (62.9% $SiO_2$, 17.1% $Al_2O_3$, 2.4% MgO) and Gelwhite™ L (66.5% $SiO_2$, 14.7% $Al_2O_3$, 3.2% MgO), both from Southern Clay in Gonzales, Tex.; MicroLite™ Vermiculite Dispersion from Grace Construction Products in Cambridge, Mass. Typically, the colloidal clays are between about 5% and about 10% solids in water.

Useful inorganic water-soluble salts include, for example, sodium silicate, potassium silicate, aluminum sulfate, sodium aluminate, and mixtures thereof Preferred inorganic water-soluble salts include, for example, sodium silicate and potassium silicate.

Typically, useful sodium silicates have a $SiO_2/Na_2O$ range from about 0.4 to about 4 (preferably, from about 1.5 to about 3.5). The higher this ratio is, the faster the cure rate and the more rigid the adhesive bond. Conversely, the lower this ratio is, the slower the cure rate and the more flexible the adhesive bond.

Useful inorganic water-soluble salts are commercially available. For example, sodium silicate is available as Type N sodium silicate and Stixso™ sodium silicate from PQ Corporation in Valley Forge, Pa., The adhesive can comprise optional components such as, for example, additives to reduce brittleness, impart color, or enhance light, heat reflectivity or absorption. For example, glycerin or other polyhydric alcohols can be added to improve flexibility. Inorganic pigments and/or clays can be used to impart color and/or to enhance energy reflection or absorption.

The adhesive is typically in a liquid form. However, with some mat layers (for example, organic binder-free needle tacked or dry-laid mat layers), it can be preferable that the adhesive be in the form of a gel. Gels can be formed, for example, by (1) removing water, (2) changing pH, (3) adding a salt, or (4) adding a water miscible organic solvent. The extent of gelation can be controlled to optimize the viscosity, thus reducing absorption of the adhesive into the mat layers.

The viscosity of colloidal particle solutions can also be increased by adding fumed silica, compatible metal oxides, or hydroxide powders. Viscosity can also be increased by adding compatible conventional organic thickening agents.

The adhesive of the invention can comprise some organic adhesive (for example, organic binders disclosed above). Typically, the adhesive will comprise less than about 50% by weight (preferably, less than about 20%) by weight organic adhesive.

Method

The multilayer mounting mat of the invention can be made by applying the adhesive to a major surface of a first mounting mat layer and lightly compressing together a major surface of a second mounting mat layer to the adhesive-coated surface of the first mounting mat layer. As used herein, the term "compressing" means applying adequate pressure to create enough contact for bonding of the mat surfaces to occur (for example, light pressure such as finger pressure can be adequate for certain embodiments).

A thin layer of the adhesive can be applied to the surface of a first mat layer as a continuous layer or as a discontinuous layer (for example, as discrete dots or stripes). Optionally, adhesive can be applied to the surface of the second mat layer as well. The application can be accomplished using any useful technique, for example, by coating, spraying or dripping. After the adhesive is applied, the first mounting mat layer can be compressed together (for example, using a nip roll or any other useful means of compression/lamination) with the second mounting mat layer.

Typically, the amount of adhesive applied and compression force are controlled such that the adhesive remains primarily at the interface between the two mat layers when they are compressed. A sufficient amount of adhesive typically remains on the surfaces of the mat layers to provide a bond strong enough to keep the layers together when bend into a circle or roll (for example, into a 2.5 inch diameter cylinder). Preferably, the adhesive penetrates less than about 20% (more preferably, less than about 10%) of the thickness of the two layers.

Adhesion (that is, curing of the adhesive) is generated by the evaporation of water from the adhesive. Optionally, the rate of evaporation of water from the adhesive can be accelerated by the application of heat. A microwave or radiofrequency (RF) oven may also optionally be used to accelerate the evaporation of water.

Curing of silicate adhesives can be accelerated with chemical cure agents such as, for example, mineral or organic acids, acid salts, or carbon dioxide.

The method of the invention can optionally be carried out as a continuous roll-to-roll process.

Multilayer Mounting Mats and Pollution Control Devices

The multilayer mounting mat of the invention has a first layer, a second layer, and an adhesive (as described above) sandwiched therebetween. The adhesive bonds together a major surface of the first layer to a major surface of the second layer. The mat layers can comprise the same materials or different materials. For example, the first and second layers can both be intumescent layers (comprising the same intumescent materials or different materials); the first and second layers can both be non-intumescent layers (comprising the same non-intumescent materials or different materials); or the first layer can be an intumescent layer and the second layer can be a non-intumescent layer (or vice versa). The multilayer mounting mat can also have additional mat layers. A preferred 3-layered embodiment of the multilayer mounting mat of the invention, for example, has a "sandwich" construction in which an intumescent layer is sandwiched between two non-intumescent layers.

Typically, the multilayer mounting mat of the invention is flexible (that is, it passes the bend test described below).

The adhesive layer bonding the layers together can be a continuous or a discontinuous layer (preferably, a discontinuous layer). The adhesive layer typically has a dry coating weight between about 5 and about 175 g/m$^2$ (preferably, between about 15 and about 100 g/m$^2$; more preferably, between about 20 and about 70 g/m$^2$).

The multilayer mounting mat of the invention is operatively adapted for use in mounting a pollution control element in a pollution control device (for example, for use in a catalytic converter or a diesel particulate filter.)

Pollution control devices generally comprise a casing, a pollution control element (for example, a catalytic element or a particulate filter element) disposed in the casing, and a mounting mat positioned between the pollution control element and the casing.

The casing (also often referred to as a can or a housing) can be made from suitable materials known in the art for such use and is typically made from metal. Preferably, the casing is made of stainless steel.

Suitable catalytic converter elements, also referred to as monoliths, are known in the art and include those made of metal or ceramic. The monoliths or elements are used to support the catalyst materials for the converter. A useful catalytic converter element is disclosed, for example, in U.S. Pat. No. RE 27,747 (Johnson).

Further, ceramic catalytic converter elements are commercially available, for example, from Coming Inc. of Coming, N.Y., and NGK Insulator Ltd. of Nagoya, Japan. For example, a honeycomb ceramic catalyst support is marketed under the trade designation Celcor™ by Coming Inc. and Honeyceram™ by NGK Insulator Ltd. Metal catalytic converter elements are commercially available from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (for example, metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381.

Conventional monolithic type diesel particulate filter elements are typically wall flow filters comprised of honeycombed, porous, crystalline ceramic (for example, cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Coming Inc. of Coming, N.Y., and NGK Insulator Ltd. of Nagoya, Japan. Further, useful diesel particulate filter elements are discussed in "Cellular Ceramic Diesel Particulate Filter," Howitt et al., Paper No. 10114, SAE Technical Paper Series, 1981.

In use, the multilayer mounting mat of the invention is disposed between the monolith and the casing in similar fashion for either a catalytic converter or for a diesel particulate filter. This can be done by wrapping the monolith with a sheet of the multilayer mounting mat, inserting the wrapped monolith into the casing, and sealing the casing.

EXAMPLES

Objects and advantages of this invention are further illustrated by the following examples.

Test Methods

Tensile Strength Test

This test provides an indication of the strength of the adhesive bond between the mats. A sample was prepared by painting the surface of one end of a strip of mat measuring 1 inch by 6 inches with adhesive such that the adhesive extended at least one inch from the end. A second strip of mat measuring 1 inch by 6 inches was placed over the first so that it overlapped the first by one square inch, and the free ends of each strip extended in opposite directions. The coated area was pressed with light finger pressure to squeeze out the excess adhesive from the bondline. The laminated sample was placed in an oven set at 80° C. for about 60 minutes. The sample was removed and cooled to room temperature (at least 10 minutes). The tensile test was performed on a Model 100-P-12 Tensile Tester (available from Test Resources, Shakopee, Minn.) by clamping one end in the upper jaw and the other in the lower jaw of the tester and pulling at a crosshead speed of one inch per minute. The tensile strength was recorded in pounds per square inch and the failure mode was noted. A cohesive failure in the mat indicated that the adhesive bond strength was greater than the cohesive strength of the mat and delamination within the mat occurred. An adhesive failure was characterized by the mats pulling away from each other substantially intact, indicating that the adhesive did not hold the mats together. A mixed failure indicates both modes of failure were observed in the test sample.

T-Peel Adhesion Test

Two strips of mat were cut into 1 inch by 8 inches (2.54 cm by 20.3 cm). Adhesive was applied to approximately 5 inches (10.6 cm) of each strip using a paint brush. The coated surfaces of the two strips of mat were mated together using light finger pressure to squeeze out the excess adhesive from the bondline. The two layered sample was placed in an oven set at 150° C. for about 10 minutes. The sample was removed and cooled to room temperature (at least 10 minutes). The laminated sample was tested for T-peel Adhesion using the Model 100-P-12 Tensile Tester by carefully clamping the free end of each of the strips into the upper and lower jaws of the tester. The crosshead speed was 5 inches per minute (12.7 cm/min) and the jaw separation was 10 inches. The average force in grams per inch width and failure mode were recorded. Failure modes are as described above for the Tensile Strength Test.

Bend Test

This test provides a qualitative indication of how well mat materials stay adhered to each other when bent into a circle. A sample was prepared by painting two strips of mat measuring 1 inch by 8 inches with adhesive, and then pressing the coated surfaces together using light finger pressure to squeeze out the excess adhesive. The sample was dried in an oven set at 150° C. for about 10 minutes. After cooling to room temperature, the sample was wrapped around a 2.5 inch diameter cylinder. The result was pass, i.e., the mats stayed adhered to each other; or fail, i.e., the two strips of mat separated from each other (typically with little or no delamination of the mats) or the mat exhibited cracking within the mat. Cracking of the adhesive within the interface between the mats is acceptable as long as the mats themselves do not crack.

Examples 1-3

Example 1 was prepared according to the procedure for the Tensile Strength Test described above by painting a thin layer of liquid sodium silicate (Sodium Silicate Type N available from PQ Corporation, Valley Forge, Pa.) onto a 1 inch by 6 inch strip of an intumescent mounting mat having a basis weight of 800 grams per square meter (3M® Interam® 550 Intumescent Mat made by 3M Co., St. Paul Minn.) and pressing a second strip of the same material onto it. Test Results are shown in Table 1.

Example 2 was prepared according to the procedure of Example 1 except that 5% glycerin was added to the adhesive composition.

Example 3 was prepared according to the procedure of Example 1 except that the second mat was a 1435 grams per square meter non-intumescent mat (3M® Interam® 900HT Intumescent Mat made by 3M Co., St. Paul Minn.)

TABLE 1

Tensile Strength

| Example | Tensile Strength - lbs/inch$^2$ | Failure Mode |
|---|---|---|
| 1 | 13.6 | Cohesive |
| 2 | 11.7 | Cohesive |
| 3* | 1.2 | Cohesive |

*Example 3 showed fibers pulled irregularly from the mat indicating that the nonintumescent mat had pulled apart.

Examples 4-16

Examples 4-16 were prepared using the intumescent mats described in Example 1 and the adhesives shown in Table 2 below. Test samples were prepared and tested according to the test procedures for Tensile Strength Test, the Bend Test, and the T-Peel Adhesion Test. Results are shown in Table 2. The samples for T-Peel Adhesion were not run on a tensile tester, but were pulled apart by hand and the failure mode was recorded.

TABLE 2

Various adhesives

| Ex | Adhesive * | Tensile Strength lbs/inch$^2$ | Bend test | Peel Failure Mode |
|---|---|---|---|---|
| 4 | Colloidal silica | 4.7 | Pass | Cohesive |
| 5 | 50% sodium silicate | 5 | Pass | Cohesive |
| 6 | Sodium silicate | 5.5 | Pass | Cohesive |
| 7 | Alum | 3.8 | Pass | Cohesive |
| 8 | 5% Clay in water | 7.3 | Pass | Cohesive |
| 9 | 10% hydrous sodium lithium magnesium silicate in water | 7 | Pass | Cohesive |
| 10 | 10% Colloidal clay in water | 7.8 | Pass | Cohesive |
| 11 | Colloidal silica + silicate | 6.6 | Pass | Cohesive |
| 12 | Colloidal silica + alum | 6.5 | Pass | Cohesive |
| 13 | Colloidal silica + boric acid | 6.6 | Pass | Adhesive |
| 14 | Sodium silicate + alum | 4.2 | Pass | Adhesive |
| 15 | Sodium silicate + boric acid | 7.4 | Pass | Cohesive |
| 16 | Gelwhite L + alum | 7.2 | Pass | Cohesive |

* Adhesive used in each example was:
Example 4 - Nalco 2327 available from Nalco Co., Naperville, IL
Example 5 - Sodium silicate diluted 50/50 with tap water (PQ ® Sodium Silicate Type N available from PQ Corporation, Valley Forge, PA)
Example 6 - Sodium Silicate Type N available from PQ Corporation, Valley Forge, PA
Example 7 - 50% Aluminum sulfate (alum) in water (available from Hawkins Inc., Minneapolis, MN)
Example 8 - colloidal montmorillonite (Gelwhite L available from Southern Clay Products Inc., Gonzales, TX (subsidiary of Rockwood))
Example 9 - sodium lithium magnesium silicate (LAPONITE RD, available from Rockwood Additives LTD, Widnes, UK)
Example 10 - colloidal montmorillonite clay (MINERAL COLLOID ® BP ® (available from Southern Clay Products Inc., Gonzales, TX (subsidiary of Rockwood))
Example 11 - Nalco 2327 with silicate 50/50 by weight
Example 12 - Nalco 2327 with alum 50/50 by weight
Example 13 - Nalco 2327 with saturated boric acid 50/50 by weight
Example 14 - Sodium silicate Type N with alum 50/50 by weight
Example 15 - Sodium silicate Type N with boric acid
Example 16 - Gelwhite L with alum 50/50

Examples 17-33

Examples 17-33 were prepared using the intumescent mats described in Example 1 and the adhesives shown in Table 3 below. The samples were prepared and tested according to the T-Peel Adhesion Test procedure

TABLE 3

T-peel Adhesion With Various Adhesives

| Ex | Adhesive** | T-Peel Adhesion Grams/inch width | Failure Mode |
|---|---|---|---|
| 17 | 20 nm positive charge colloidal silica | 101 | Cohesive |
| 18 | 75 nm negative charge colloidal silica | 101 | Cohesive |
| 19 | 8 nm negative charge colloidal silica | 119 | Cohesive |
| 20 | 13 nm negative charge colloidal silica | 119 | Cohesive |
| 21 | Colloidal silica negative charge - bimodal particle size | 107 | Cohesive |
| 22 | 35% Alum in tap water | 105 | Cohesive |
| 23 | 35% Sodium aluminate in tap water | 103 | Cohesive |
| 24 | Saturated potassium chloride solution | 68 | Mixed |
| 25 | Saturated sodium chloride solution | 75 | Mixed |
| 26 | Sodium Silicate | 118 | Cohesive |
| 27 | Sodium Silicate | 108 | Cohesive |
| 28 | 5% Colloidal clay in water | 130 | Cohesive |
| 29 | 5% Laponite in water | 108 | Cohesive |
| 30 | Exfoliated vermiculite | 123 | Cohesive |
| 31 | Kaolin clay - 200 nm blended | 40 | Adhesive |
| 32 | Bentonite Clay | 111 | Cohesive |
| 33 | Sodium silicate gel | 111 | Cohesive |

**Adhesive using in each example was:
Example 17 - Nalco 1056 available from Nalco Co., Naperville, IL
Example 18 - Nalco 2329 available from Nalco Co., Naperville, IL
Example 19 - Nalco 1130 available from Nalco Co., Naperville, IL
Example 20 - Nalco 1030 available from Nalco Co., Naperville, IL
Example 21 - Ludox PW 50 EC bimodal available from W. R. Grace Co., Columbia, MD
Example 22 - 50% Aluminum sulfate available from Hawkins Inc., Minneapolis, MN
Example 23 - 35% Sodium aluminate available from Nalco Co., Naperville, IL
Example 24 - Saturated Potassium chloride available from Hawkins Inc Minneapolis, MN
Example 25 - Saturated Sodium chloride available from EM Science, Cherry Hill NJ
Example 26 - Stixso ™ sodium silicate available from PQ Corp., Valley Forge, PA
Example 27 - Type N sodium silicate available from PQ Corp, Valley Forge, PA
Example 28 - 5% Gelwhite in water
Example 29 - 5% Laponite RD in water available from Rockwood Additives, LTD, Princeton, NJ
Example 30 - Microlite exfoliated vermiculite available from Grace Construction Products, Cambridge, MA
Example 31 - Dixie Clay (200 nm) available from R. T. Vanderbilt Co, Norwalk, CT; blended in a Waring blender for 60 seconds to reduce particle size
Example 32 - Bentonite clay available from Wyo-Ben, Billings MT
Example 33 - Laponite RD/sodium silicate gel available from Rockwood Additives, LTD, Princeton, NJ Example 34

A 3-layered mat was prepared by laminating two non-intumescent mats described in Example 3 to the intumescent mat described in Example 1 using Sodium Silicate Type N as the adhesive. The intumescent mat was sandwiched between the two non-intumescent mats. The 3-layered may was flexible and was easily wrapped around a cordierite monolith without cracking or delaminating.

Comparative Examples C1-C11

Comparative Examples C1-C11 were prepared using the intumescent mats described in Example 1 and the adhesives listed below to make samples for the T-Peel Adhesion Test. The samples were separated by hand and did not hold together at all (No bond) or did not hold together sufficiently to be clamped into the jaws of the tensile tester (Poor bond). Failures were all adhesive with no delamination in the mats.
C1—Saturated Boric acid—No bond
C2—20% Titanium dioxide (2 micron) in water—No bond
C3—Calcium oxide powder available from JT Baker—No bond
C4—M-5 fumed silica available from Cabot—No bond
C5—M-5 blended in Waring blender—No bond
C6—Aluminum hydroxide—No bond
C7—20% Calcium sulfate in water, EM Science, Cherry Hill, N.J.—Poor bond
C8—Dixie Clay (200 nm—not blended)—Poor bond
C9—Aluminum hydroxide (3.5 micron), Huber Inc Norcross Ga.—Poor bond
CR10—Magnesium hydroxide (5 micron), Albemarle Inc., Baton Rouge, La.—Poor bond
C11—Water—No bond Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

I claim:

1. A multilayer mounting mat operatively adapted for use in mounting a pollution control element in a pollution control device, said mounting mat being dry and comprising a first layer having a first and second major surface, a second layer having a first and second major surface, and an adhesive sandwiched therebetween so as to bond together the first major surface of said first layer to the first major surface of said second layer, said adhesive comprising at least one of inorganic colloidal particles having an average diameter less than about 300 nm and an inorganic water-soluble salt, wherein said adhesive remains primarily at an interface between said first layer and said second layer.

2. The multilayer mounting mat of claim 1 wherein said adhesive comprises an inorganic water-soluble salt.

3. The multilayer mounting mat of claim 2 wherein said inorganic water-soluble salt is selected from the group consisting of sodium silicate, potassium silicate, aluminum sulfate, sodium aluminate, and mixtures thereof.

4. The multilayer mounting mat according to claim 2 wherein said inorganic water-soluble salt is sodium silicate or potassium silicate.

5. The multilayer mounting mat according to claim 1 wherein said adhesive comprises inorganic colloidal particles having an average diameter less than about 300 nm.

6. The multilayer mounting mat of claim 5 wherein said inorganic colloidal particles have an average diameter less than about 100 nm.

7. The multilayer mounting mat according to claim 1 wherein said inorganic colloidal particles are selected from the group consisting of colloidal silica, colloidal alumina, colloidal clays and mixtures thereof.

8. The multilayer mounting mat according to claim 1 wherein said inorganic colloidal particles include colloidal silica and colloidal clay.

9. The multilayer mounting mat according to claim 1 wherein said first mounting mat layer and said second layer are each a non-intumescent layer or an intumescent layer.

10. The multilayer mounting mat according to claim 1 wherein one of said first layer and said second layer is an intumescent layer and the other is a non-intumescent layer.

11. The multilayer mounting mat according to claim 1 wherein said adhesive is in the form of a discontinuous layer.

12. The multilayer mounting mat according to claim 1 wherein said adhesive penetrates less than about 20% of the thickness of said first layer and said second layer.

13. The multilayer mounting mat according to claim 1 wherein said adhesive has a dry coating weight between about 5 and about 175 $g/m^2$.

14. The multilayer mounting mat according to claim 1 wherein said adhesive exhibits a cohesive failure mode when tested for tensile strength or T-peel adhesion.

15. The multilayer mounting mat according to claim 1 wherein said adhesive is a gel.

16. The multilayer mounting mat according to claim 1 further comprising a third layer, wherein a major surface of said third layer is adhered to the second major surface of said second layer by an adhesive comprising at least one of inorganic colloidal particles having an average diameter less than about 300 nm or an inorganic water-soluble salt.

17. The multilayer mounting mat of claim 16 wherein said first layer and said third layer are each a non-intumescent layer and said second layer is an intumescent layer.

18. The multilayer mounting mat according to claim 1 wherein said mat is operatively adapted for use in a catalytic converter.

19. The multilayer mounting mat according to claim 1 wherein said mat is operatively adapted for use in a diesel particulate filter.

20. A method for making a multilayer mounting mat according to claim 1, said method comprising:
   (a) applying an adhesive comprising at least one of inorganic colloidal particles having an average diameter less than about 300 nm or an inorganic water-soluble salt to a major surface of a first mounting mat layer;
   (b) compressing together a major surface of a second mounting mat layer to the adhesive-coated surface of said first mounting layer to form a multilayer mounting mat; and
   (c) drying said multilayer mounting mat,
   wherein the adhesive remains primarily at an interface between the first layer and the second layer.

21. A pollution control device comprising a casing, a pollution control element disposed in said casing, and a multilayer mounting mat according to claim 1 positioned and compressed between so as to mount said pollution control element within said casing, wherein said adhesive remains primarily at an interface between said first layer and said second layer.

22. The pollution control device of claim 21 wherein said pollution control element is a catalytic element or a particulate filter element.

23. The multilayer mounting mat according to claim 1 wherein said adhesive penetrates less than about 10% of the thickness of said first layer and said second layer.

24. The multilayer mounting mat according to claim 12 wherein said adhesive is a gel.

25. The multilayer mounting mat according to claim 1 wherein said adhesive provides a bond strong enough to keep said first layer and said second layer together, when said mat is bent into a 2.5 inch diameter cylinder.

26. The multilayer mounting mat according to claim 1 wherein said adhesive is a gel, said adhesive penetrates less than about 10% of the thickness of said first layer and said second layer, and said adhesive provides a bond strong enough to keep said first layer and said second layer together when said mat is bent into a 2.5 inch diameter cylinder.

27. The method according to claim 20 wherein the adhesive is a gel when applied, the adhesive penetrates less than about 20% of the thickness of the first and second layers after said compressing, and the adhesive provides a bond strong enough to keep the first and second layers together when said mat is bent into a 2.5 inch diameter cylinder after said drying.

* * * * *

UNITED STATES PATENT AND TRADEMARK OFFICE
CERTIFICATE OF CORRECTION

PATENT NO. : 8,277,925 B2
APPLICATION NO. : 12/302707
DATED : October 2, 2012
INVENTOR(S) : Peter T Dietz It is certified that error appears in the above-identified patent and that said Letters Patent is hereby corrected as shown below:

Column 3
Line 67, delete "$K^{+Ca^{++}}$," and insert -- $K^+$, $Ca^{++}$, --.

Column 5
Line 15, delete "borosilcate" and insert -- borosilicate --.

Column 6
Line 14, delete "theylene" and insert -- ethylene --.
Line 59, delete "thereof" and insert -- thereof. --.

Column 7
Line 31, delete "$Al_2O3$." and insert -- $Al_2O_3$. --.

Column 9
Line 56, delete "thereof" and insert -- thereof. --.

Column 11
Line 21, delete "thereof" and insert -- thereof. --.

Column 12
Line 42, delete "aluminoilicate" and insert -- aluminosilicate --.

Column 13
Line 9, delete "aluminoilicate" and insert -- aluminosilicate --.
Line 35, delete "Coming" and insert -- Corning --.
Line 46, delete "aluminoilicate" and insert -- aluminosilicate --.

Column 16
Line 16, delete "thereof" and insert -- thereof. --.

Signed and Sealed this
Fifth Day of March, 2013

Teresa Stanek Rea
*Acting Director of the United States Patent and Trademark Office*

CERTIFICATE OF CORRECTION (continued)
U.S. Pat. No. 8,277,925 B2

Column 18

Line 28, delete "thereof" and insert -- thereof. --.

Column 22

Lines 16-17, delete "nonintumescent" and insert -- non-intumescent --.